US006789732B2

(12) United States Patent
Dollhopf et al.

(10) Patent No.: US 6,789,732 B2
(45) Date of Patent: Sep. 14, 2004

(54) CAR WASH ENTRY STATION WITH SECURITY VAULT

(75) Inventors: Kenneth J. Dollhopf, Green Bay, WI (US); Kimmo Ukkola, DePere, WI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/431,689

(22) Filed: May 8, 2003

(65) Prior Publication Data

US 2003/0209598 A1 Nov. 13, 2003

Related U.S. Application Data

(60) Provisional application No. 60/380,236, filed on May 13, 2002.

(51) Int. Cl.[7] .................................................. G06F 7/08

(52) U.S. Cl. ........................ 235/381; 235/380; 235/382

(58) Field of Search ................................. 235/381, 380, 235/382

(56) References Cited

U.S. PATENT DOCUMENTS

| | | | | | |
|---|---|---|---|---|---|
| 3,629,834 | A | | 12/1971 | Randall et al. | 340/149 |
| 4,121,523 | A | | 10/1978 | Hastings | 109/2 |
| 4,380,316 | A | * | 4/1983 | Glinka et al. | 232/16 |
| 4,417,527 | A | | 11/1983 | Williams et al. | 109/2 |
| 4,595,828 | A | * | 6/1986 | Lundblad | 235/379 |
| 4,648,327 | A | * | 3/1987 | Toth et al. | 109/57 |
| 4,696,239 | A | | 9/1987 | Trucksess | 109/24.1 |
| 4,884,514 | A | | 12/1989 | Shockey et al. | 109/24.1 |
| 5,483,047 | A | * | 1/1996 | Ramachandran et al. | 235/379 |
| 5,788,348 | A | * | 8/1998 | Ramachandran et al. | 312/223.1 |
| 5,860,714 | A | * | 1/1999 | Skord, Jr. | 312/242 |
| 5,883,371 | A | | 3/1999 | Meeker | 235/379 |
| 5,907,141 | A | * | 5/1999 | Deaville et al. | 235/375 |
| 5,918,720 | A | * | 7/1999 | Robinson et al. | 194/206 |
| 6,003,008 | A | | 12/1999 | Postrel et al. | 705/4 |
| 6,006,989 | A | | 12/1999 | Ademmer et al. | 235/379 |
| 6,039,164 | A | | 3/2000 | Waters et al. | 194/206 |
| 6,186,339 | B1 | | 2/2001 | Saltsov et al. | 209/534 |
| 6,230,426 | B1 | * | 5/2001 | Fakhoury et al. | 40/606.03 |
| 6,315,194 | B1 | * | 11/2001 | Graef et al. | 235/379 |
| 6,477,505 | B2 | | 11/2002 | Ward, II et al. | 705/13 |

OTHER PUBLICATIONS

"E–Systems E–3000", Unitec Electronics Brochure, Version UE042001.
"Enterlink", Unitec Electronics Brochure, Version UE122001.
"Wash Select II POS", Unitec Electronics Brochure, Version UE042002.
"Wash Select II", Unitec Electronics Brochure, Version UE 042002.
"Automated Attendant", Gilbarco Brochure P–2316A, 2002.
"Entry Wizard", Unitec Electronics Brochure, admitted prior art.

(List continued on next page.)

*Primary Examiner*—Michael G. Lee
*Assistant Examiner*—Kimberly D. Nguyen
(74) *Attorney, Agent, or Firm*—Andrus, Sceales, Starke & Sawall

(57) ABSTRACT

An entry station for use primarily with a car wash that includes a semi-secure electronics cabinet and a security vault. The electronics cabinet is mounted to the security vault and includes a front door secured by a first lock member. The electronics cabinet defines an open interior that encloses the electronic operating components for the entry station. When the access door to the electronics cabinet is open, the front door for the security vault can be accessed. The front door of the security vault includes a combination lock that prevents unauthorized access to the security vault. The two separate locks for the electronics cabinet and the security vault allow a service technician to have access to the electronics cabinet without gaining access to the security vault.

19 Claims, 10 Drawing Sheets

OTHER PUBLICATIONS

"The Paymaster System", Exacta USA, Inc. Brochure, 03012002.

"The Excel ST System", Exacta USA, Inc. Brochure, 03012002.

"The Millennium System with POS", Exacta USA, Inc. Brochure, 03012002.

"The Millennium and Excel ST or Paymaster System with POS", Exacta USA, Inc. Brochure, 03012002.

"How Can You Make Money If You Can't Take Money?" Ryko brochure 20335–074, Apr. 2001.

"ACW5 ACW5–CRC", Hamilton Mfg. Corp. Brochure, admitted prior art.

"Autotec 5 Autotec 5–CRC", Hamilton Mfg. Corp. Brochure, admitted prior art.

* cited by examiner

CAR WASH ENTRY STATION WITH SECURITY VAULT

CROSS REFERENCE TO RELATED APPLICATION

The present application is based on and claims priority to U.S. Provisional Patent Application No. 60/380,236 filed on May 13, 2002.

BACKGROUND OF THE INVENTION

The present invention relates to an entry station for receiving payment from a user and authorizing the operation of an automated service device. More specifically, the present invention relates to an entry station for use with a car wash that includes a semi-secure electronics cabinet for housing both the various operating components and the control unit for the entry station and a security vault for storing money received by the entry station.

Currently, most entry stations used with either an in-bay or tunnel car wash systems allow the car wash user to pay cash for the car wash services, charge the services on a credit card or enter a purchased authorization code to begin the car wash cycle. The entry station is typically positioned at the entrance to the car wash such that the user interacts with the entry station immediately before entering the car wash. Since the car wash user can pay cash for the car wash services at the entry station, the entry station must be able to make change and store the money received. In order to make change, the entry station must include a supply of bills or coins to return to the car wash user.

In currently available car wash stations, the supply of money received by the entry station is stored within the same cabinet that houses the electronic operating components, such as the computer controller, bill validator, credit card validator, etc. In this type of entry station, when a service technician opens the front panel to gain access to the electronic operating components, the service technician also has access to the stored money and to the bill dispensers contained within the cabinet. Therefore, a car wash owner is typically present when the service technician is working on the electronic operating components of the entry station to insure that theft does not occur.

Additionally, in current car wash entry station units, the entry station is able to store only a very limited supply of money. When the entry station is used with a very busy car wash, the car wash owner may need to empty the entry station multiple times in a single day. This requires the owner to shut down the wash for a few minutes each time the entry station is emptied.

Therefore, it is an object of the present invention to provide an entry station that can store a larger number of bills and coins. Further, it is an object of the present invention to provide a car wash entry station that includes a separate electronics cabinet and security vault such that service technicians can have access to the electronics cabinet without being granted access to the security vault in which money is stored.

SUMMARY OF THE INVENTION

The present invention is an entry station for use with a car wash, although other uses of the entry station are contemplated. The entry station includes a semi-secure electronics cabinet and a security vault. The electronics cabinet is preferably mounted to the security vault and includes a front access door secured by at least one lock member. The front access door of the electronics cabinet includes a display and code entry unit and various electronic operating components used to provide the required functionality for the car wash entry station. When the electronics cabinet is open, the electronic operating components and the computer control unit for the entry station are accessible and can be worked upon by a service technician.

After the door for the electronics cabinet is open, the vault door for the security vault can be accessed. The vault door of the security vault includes a combination lock that prevents unauthorized access to the security vault. Preferably, the security vault is a reinforced ATM-quality vault that provides increased security for money stored with in the security vault.

The security vault includes a removable money bin generally aligned with both a bill chute and a coin chute extending through the top wall of the security vault. The bill and coin chutes direct money received by the entry station from the car wash user into the security vault. Preferably, the money bin is sized to store a relatively large number of bills and coins such that the money bin does not need to be frequently emptied.

The security vault also includes a bill dispenser for dispensing change to the car wash user after payment for a car wash package. The bill dispenser is mounted within the security vault and dispenses bills through a bill slot formed in the vault door of the security vault. Thus, the supply of bills dispensed by the bill dispenser is safely secured within the security vault and the dispenser operates only when the security vault door is closed. Alternatively, a coin dispenser can also be included within the security vault and operated to dispense coins through a coin slot formed in the vault door of the vault.

As described above, it is an object of the present invention to provide an entry station having both a locked electronics cabinet and a security vault. The electronics cabinet includes an access door secured by a lock member. Once the door to the electronics cabinet is open, access is granted to the electronic operating components and control unit of the entry station. However, entry into the electronics cabinet does not provide access to money collected by the entry station or money supply for the bill/coin dispensers. The security vault door must be opened after the door to the electronics cabinet has been opened. The combination lock of the security vault requires additional information that is not supplied to the service technician working on the electronic components. Therefore, access can be granted to the locked electronics cabinet without granting access to the security vault.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
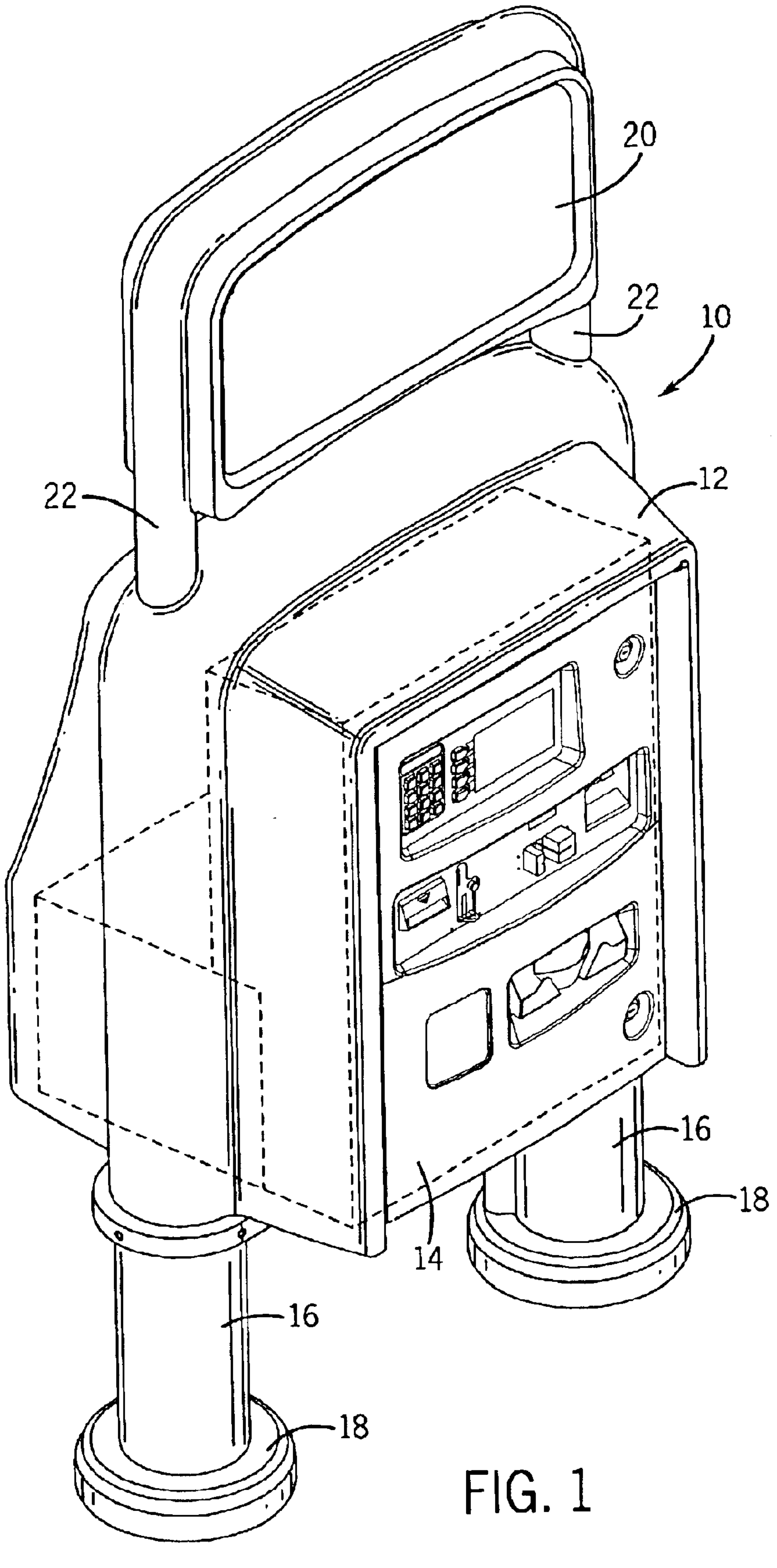
FIG. 1 is a front left perspective view of a car wash entry station incorporating the features of the present invention.

FIG. 1 illustrates an entry station 10 that is positionable at the entrance of an automated car wash to receive money, a credit card or an authorization code from a car wash user. The car wash entry station 10 allows the user to select the desired wash package and either present a monetary payment for the car wash service or enter a unique authorization code that the user received upon payment for the wash services at a remote location.

Although the entry station 10 of the present invention will be described in the following as being used with a car wash, it is contemplated by the inventors that the entry station 10 could be used to authorize operation of various different types of service devices. Such service devices may include, but are not limited to, an access gate to a controlled parking lot of structure, a batting cage, or any other type of service device that requires advanced payment before operation of the service device is authorized. The use of the entry station 10 in a car wash environment is the currently preferred embodiment.

The entry station 10 generally includes a molded outer shell 12 including a decorative face plate 14. The outer shell 12 surrounds a pair of enclosures to be described in detail below and is supported by a pair of pedestal legs 16. The pedestal legs 16 each include a decorative foot 18 that conceals the connection elements used to secure the entry station 10 at the entrance to the car wash.

In the preferred embodiment of the invention, the entry station 10 includes a sign 20 that is spaced from the outer shell 12 by a pair of spaced side supports 22. The sign 20 preferably includes a pair of speakers (not shown) that can be used to relay audio messages to the car wash user during the payment and validation process.

Figure 2:
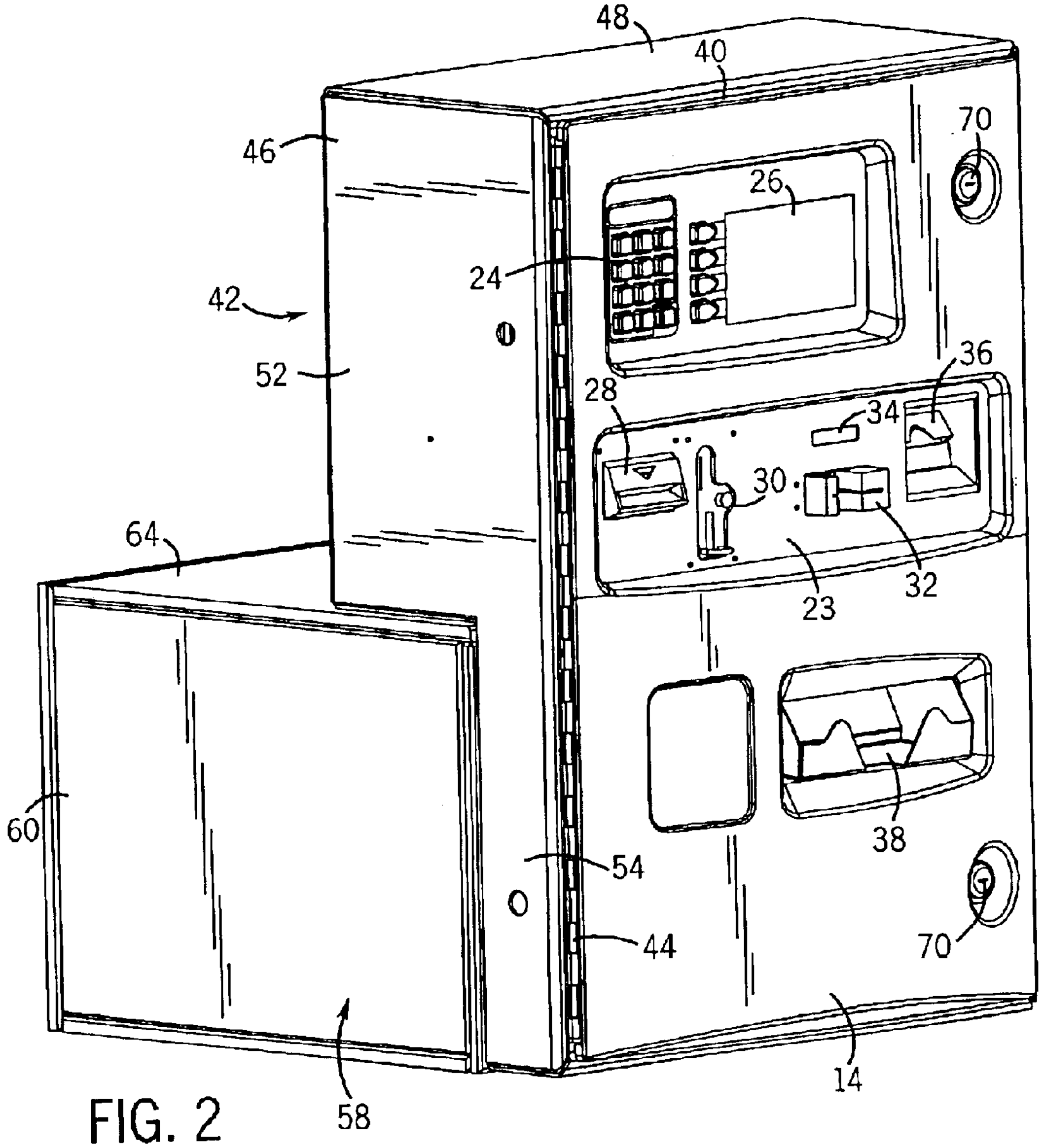
FIG. 2 is a front left perspective view of the semi-secure electronics cabinet and the security vault of the entry station.

As illustrated in FIG. 1, the decorative face plate 14 surrounds and presents a series of electronic components and devices used to receive payment from the car wash user and present information to the user. As can be seen in FIG. 2, in which the outer shell 12 has been removed, the face plate 14 is mounted to a front panel 23 and surrounds a key pad 24 and a display screen 26. The key pad 24 and display screen 26 present information to the car wash user and allow the user to enter information, such as an authorization code, as prompted by the display screen 26. Preferably, the display screen 26 is a color screen.

The front panel 23 of the entry station 10 presents the user interface to at least one money validator, such as a bill validator 28 and a coin validator 30. The remaining structure for both the bill validator 28 and coin validator 30 is mounted behind the front panel 23, as will be described below. Both the bill validator 28 and the coin validator 30 allow the car wash user to present payment directly at the entry station. Both the bill validator 28 and the coin validator 30 are commonly available commercial components.

The front panel 23 further includes a credit card reader 32, an infrared keyboard input 34 and a thermal printer output 36. The printer output 36 presents a receipt for the car wash services upon proper payment. Finally, the front panel 23 includes a bill return bin 38 that allows the entry station to provide change for overpayment received from the car wash user.

Figure 3:
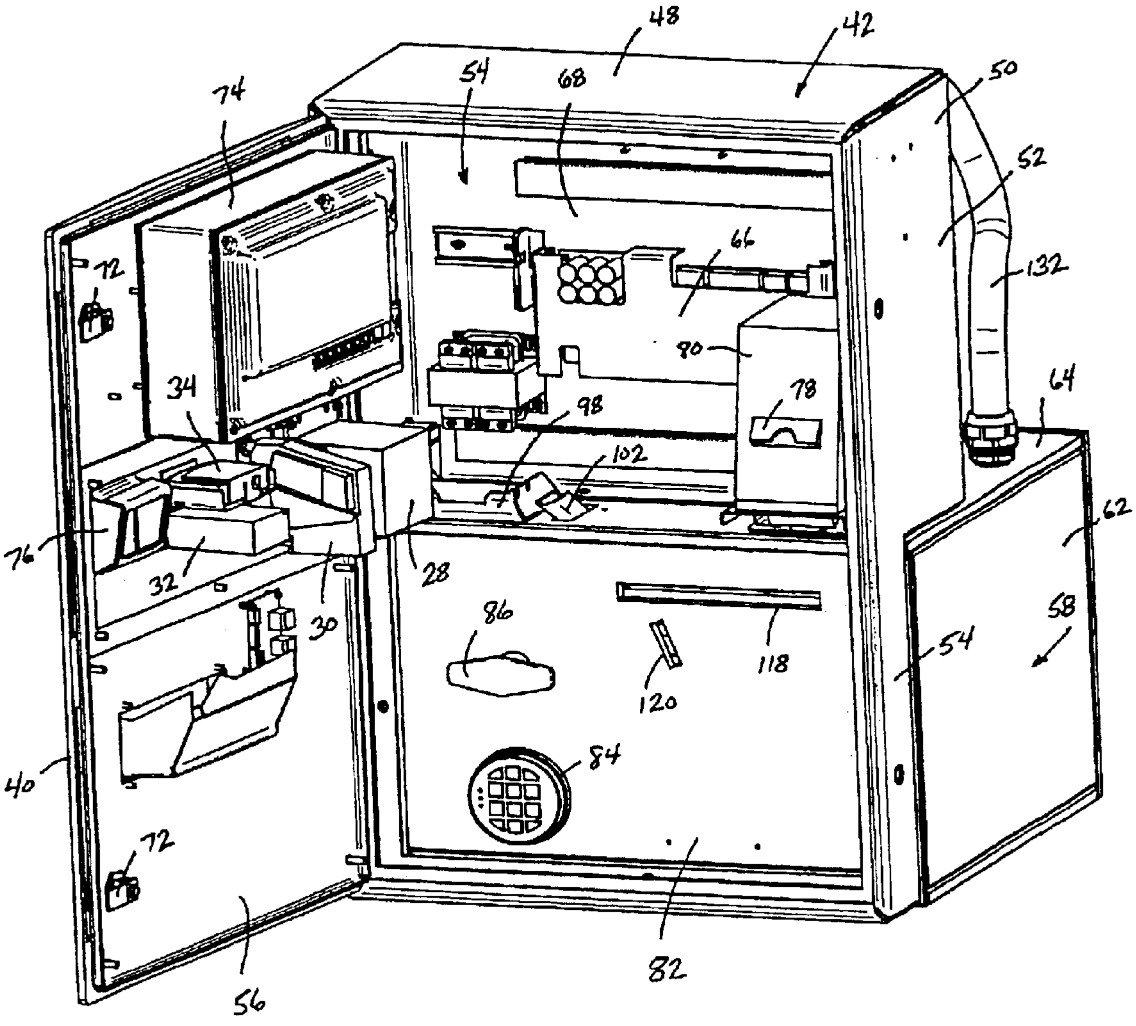
FIG. 3 is a perspective view illustrating the electronic components contained within the semi-secure electronics cabinet.

Referring now to FIG. 2, the decorative face plate 14 is attached to the front panel 23 that forms part of an access door 40. The access door 40 is connected to an electronics cabinet 42 by a hinge 44 that extends along the entire length of one side of a front panel 23. The opposite side of the hinge 44 is connected to a sidewall 46 of the electronics cabinet 42. The electronics cabinet 42 is further defined by a top wall 48 and an opposite sidewall 50 (FIG. 3) and a bottom wall (not shown). As illustrated in FIG. 2, the sidewall 46 includes an upper portion 52 and a lower portion 54. As best illustrated in FIG. 3, the upper portion 52 of each of the sidewalls 46 and 52, in combination with the top wall 48, defines a generally open interior 54 for the electronics cabinet 42 that receives all of the electronics operating components mounted to the back surface 56 of the access door 40.

In the preferred embodiment of the invention, the electronics cabinet 42, including the top wall 48 and the sidewalls 46 and 50 is formed from a durable metallic material that prevents unauthorized entry into the open interior 54 when the door 40 is in its closed position, as shown in FIG. 2.

Referring back to FIG. 2, the electronics cabinet 42 is securely mounted to a security vault 58. As can be seen in FIGS. 2 and 3, the security vault 58 includes a pair of sidewalls 60 and 62, a top wall 64 and a bottom wall. The sidewalls 60, 62, top wall 64 and bottom wall are preferably formed form a durable steel material and are connected together to form a security vault that is similar to those used in an ATM machine. The security vault 58 is constructed to store the money received by the entry station and to prevent unauthorized access to such stored money.

As illustrated in FIG. 2, the upper portion 52 of each sidewall 46 of the electronics cabinet 42 is supported on the top wall 64 of the security vault 60. The lower portion 54 of each sidewall 46 extends past the top wall 64 such that the access door 40 conceals the security vault 60 when viewed from the front.

Referring now to FIG. 3, thereshown is the access door 40 of the electronics cabinet 42 in its open position. When the door 40 is in the open position, access is granted to an electronic control unit 66 mounted to the back wall 68 of the electronics cabinet 42 and generally contained within the open interior 54. The control unit 66 can be accessed only when the door 40 is in the open position. Although not shown, a security system, such as provided by ADT, can also be mounted within the electronics cabinet to signal tampering with the entry station.

Referring back to FIG. 2, the access door 40 includes a pair of lock members 70 that limit access to the electronic components contained within the electronics cabinet 42. Preferably, each of the lock members 70 includes a unique key such that an authorized service technician can open the door 40 to the electronics cabinet 42 to work on the electronic components, including the control unit 66. As illustrated in FIG. 3, the lock member includes a latch 72 that engages a lip on the sidewall 50 to prevent unauthorized opening of the door 40.

Referring back to FIG. 3, the actual operating components for the credit card reader 32, infrared keyboard input 34 and both the bill validator 28 and coin validator 30 are mounted to the back surface 56 of the door 40. Further, a data entry and display device 74, which includes both the keypad and the display screen, is also mounted to the back surface 56 of the door 40.

As illustrated in FIG. 3, a guide bracket 76 is mounted to the back surface 56 and generally aligned with an output 78 of a thermal printer 80 contained within the open interior 54. The thermal printer 80 is operable to print a receipt, which is generated through the outlet 78 and presented to the user through the guide bracket 76. As illustrated in FIG. 3, the thermal printer 80 is supported on the top wall 64 of the security vault 58 and contained within the open interior 54 of the electronics cabinet 42.

As can be understood in FIGS. 2 and 3, if a service personnel has the required key to open the lock member 70, the access door 40 can be swung to the open position (FIG. 3) where the service technician has access to all of the electronic operating components for the car wash entry station, including the control unit 66. In this manner, the service technician can work on the electronic components without having access to the security vault 58.

Figure 4:
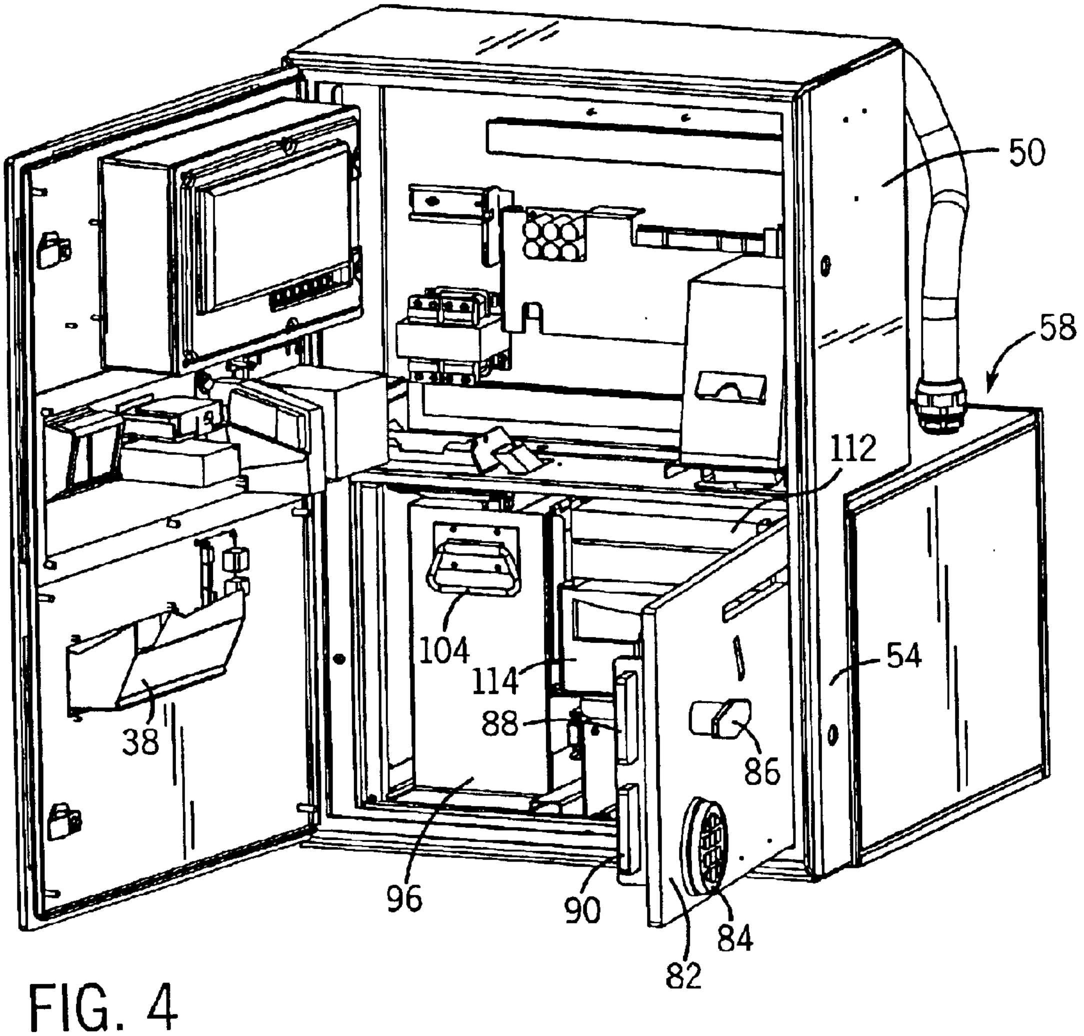
FIG. 4 is a front perspective view illustrating the open access door of the semi-secure electronics cabinet and the open vault door of the security vault.

Referring now to FIGS. 3 and 4, the security vault 58 includes a vault door 82 that is accessible only after the access door 40 of the electronics cabinet 42 has been opened. Although the preferred embodiment of the invention requires the door 40 of the electronics cabinet 42 to be open prior to accessing the door 82 of the security vault 58, it is contemplated that the lower portion 54 of each sidewall 50 could be eliminated such that both the access door 40 of the electronics cabinet 42 and the vault door 82 of the security vault 58 could be accessible at the same time. However, a feature of the preferred embodiment of the invention requires the electronics cabinet 42 and the security vault 58 to be accessible separately, such that a service technician can be granted access to the electronics cabinet 42 and not the security vault 58.

As illustrated in FIGS. 3 and 4, the vault door 82 of the security vault 58 includes a combination lock 84 and an access handle 86. The combination lock 84 allows only authorized access to the interior of the security vault 58. The combination lock 84 is separate from the lock members 70 used to open the electronic cabinet 42.

As illustrated in FIG. 3, the access handle 86 is coupled to an upper latch 88 and a lower latch 90. The upper and lower latches 88, 90 engage the opposite sidewall of the security vault and prevent the vault door 82 from being opened. As discussed previously, the security vault 58 is preferably an ATM-grade security vault that provides increased security for items contained within the security vault 58.

Figure 5:
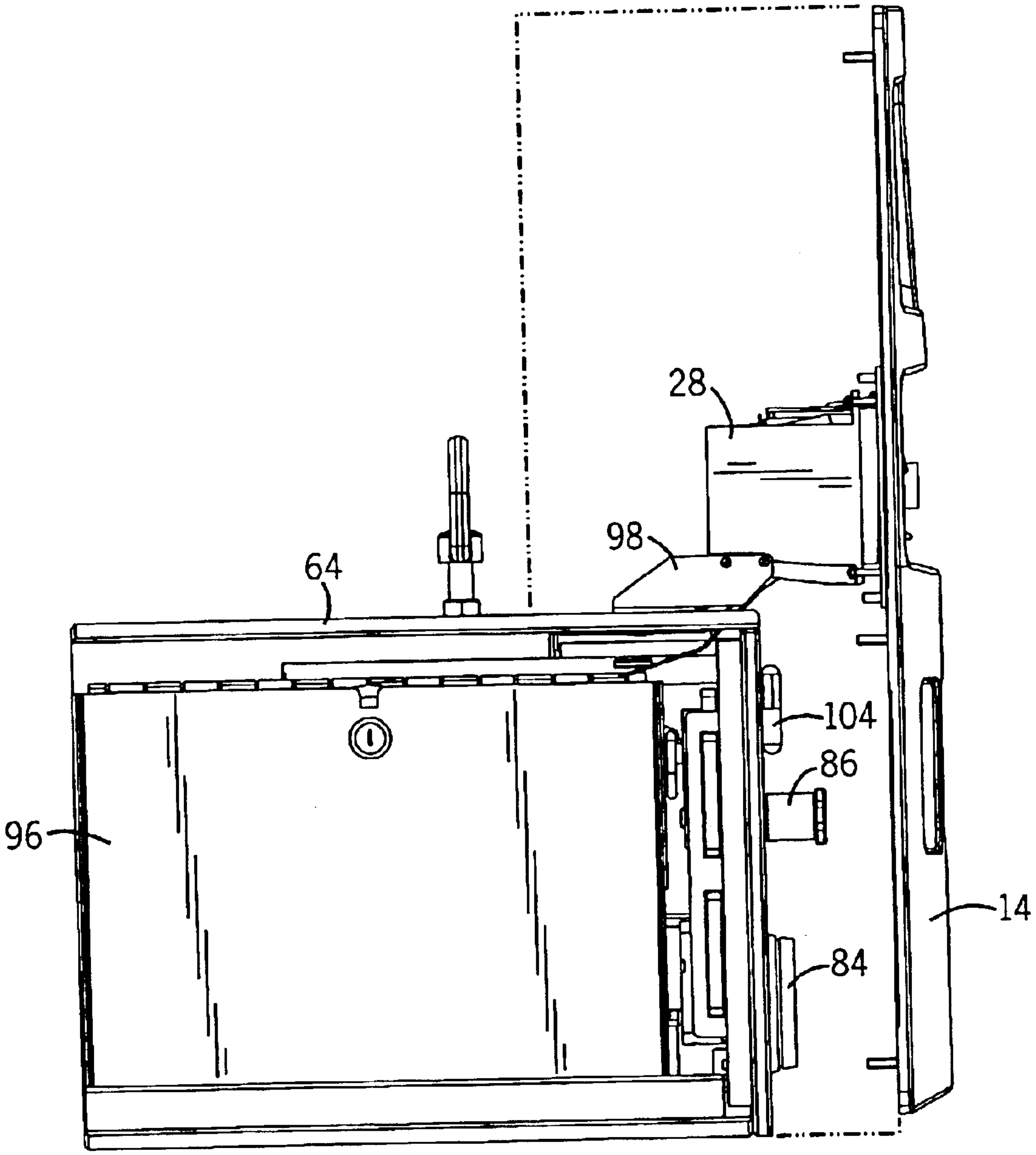
FIG. 5 is a side view illustrating the operational interconnection between the money receiving electronic components and the security vault.
Figure 6:
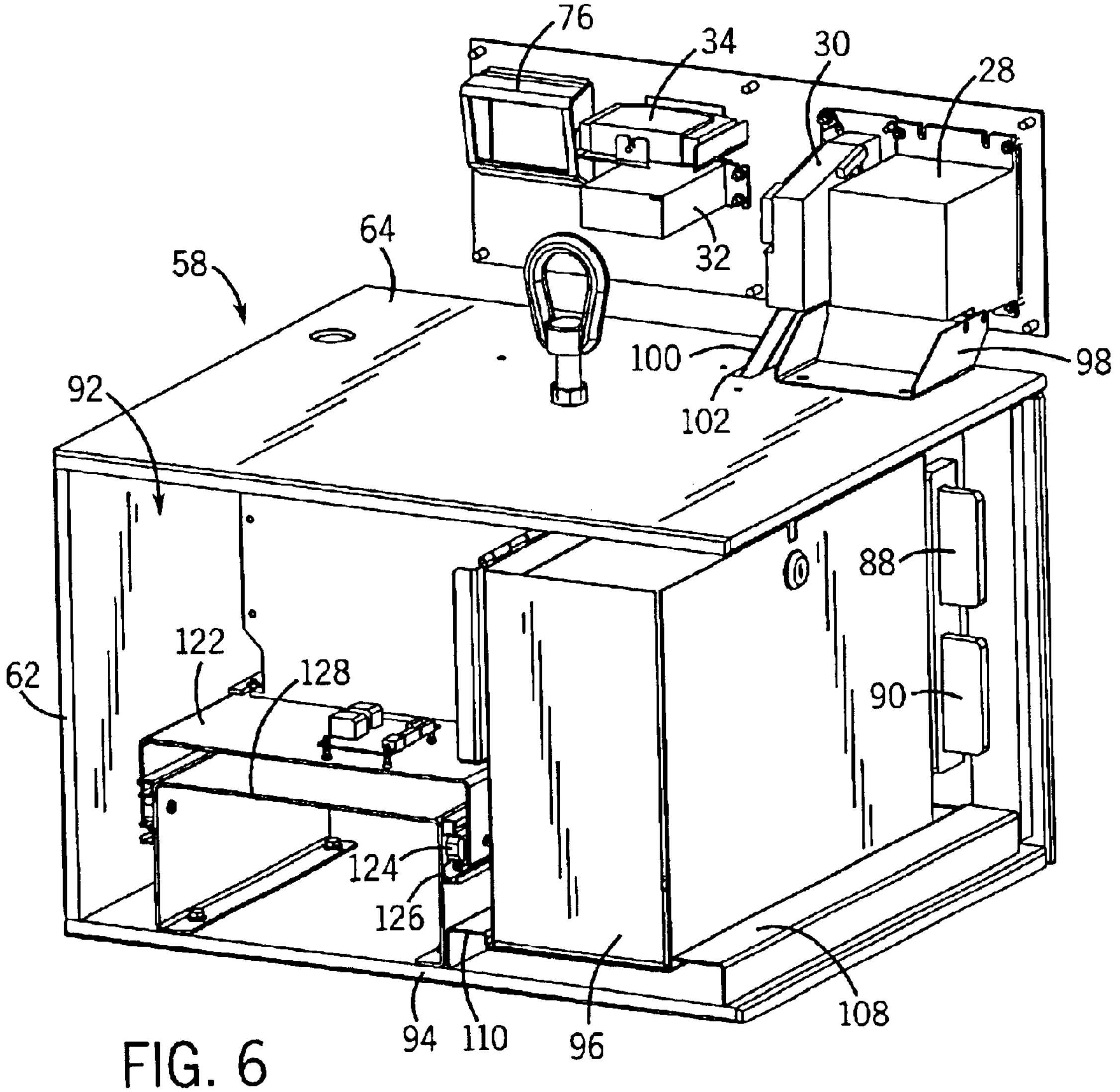
FIG. 6 is a back view further illustrating the insertion of money from the bill validator into the security vault.

Referring now to FIG. 6, the security vault 58 includes an open interior 92 defined by the top wall 64, sidewall 62 and bottom wall 94. As illustrated, a money bin 96 is sized to be received within the open interior and receive and store money collected by the bill validator 28 and coin validator 30. Specifically, when the door of the electronics cabinet is closed, the bill validator 28 is aligned with a bill chute 98 mounted to the top wall 64 of the security vault 58. The bill chute 98 extends through the top wall 64 and directs the supply of bills collected by the bill validator 28 into the money bin 96, as can be seen in FIG. 5. The bill chute 98 defines a relatively small opening in the top wall 64 such that access to the money bin 96 cannot be gained through the bill chute when the electronics cabinet is open. Referring back to FIG. 6, a coin chute 100 is generally aligned with the coin validator 30 such that coins collected by the coin validator 40 can be deposited into the money bin 96 through the coin chute 100. The coin chute 100 extends through an opening 102 formed in the top wall 64 to allow coins to enter into the money bin 96 while preventing access to the money bin 96 through the coin chute 100.

Figure 7:
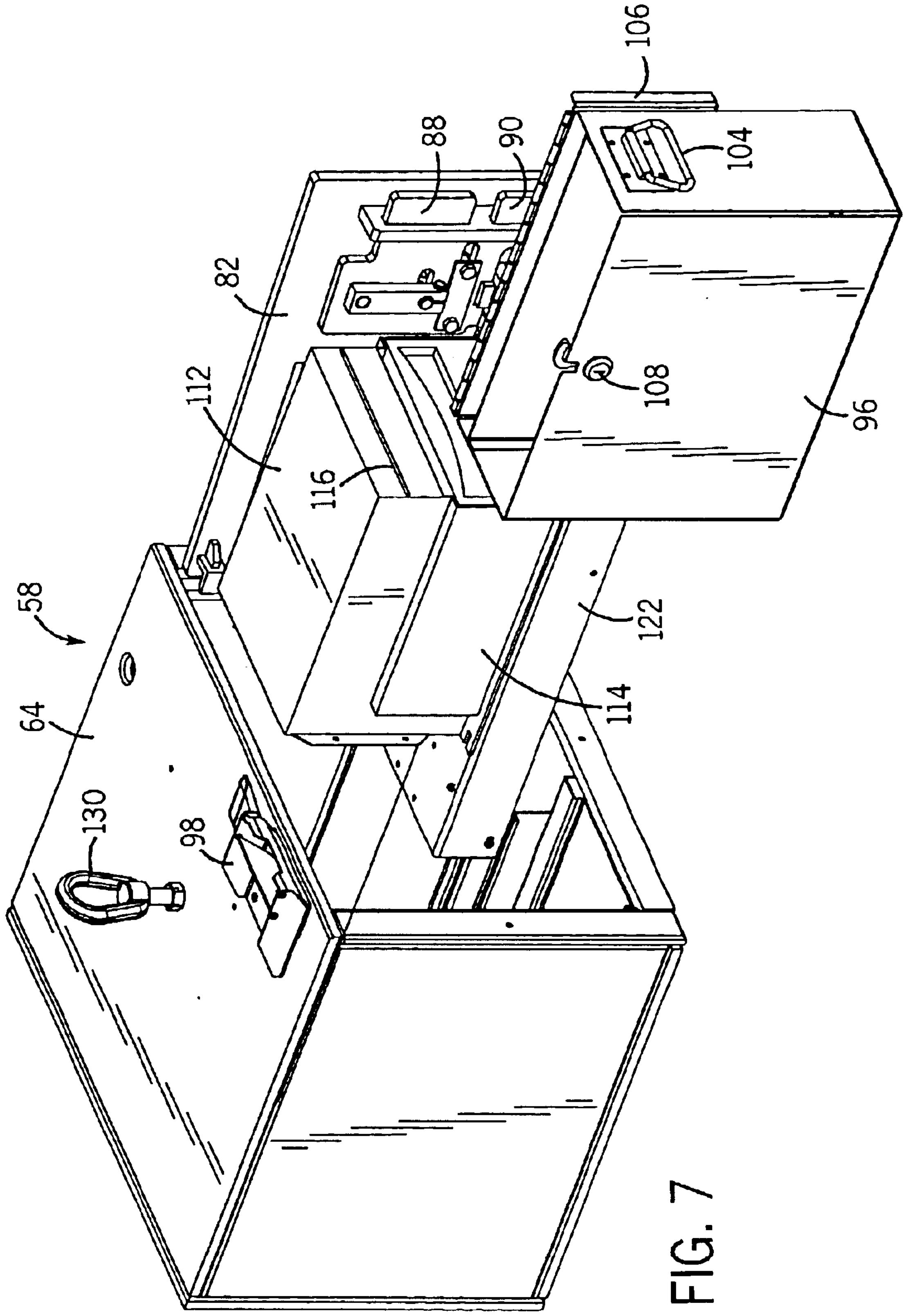
FIG. 7 is a perspective view illustrating the removable money bin and bill dispenser contained in the security vault.

Referring now to FIG. 4, the money bin 96 includes a handle 104 that allows the money bin 96 to be pulled from the open interior defined by the security vault 58. As best shown in FIG. 7, once the money bin 96 has been removed, a top cover 106 can be closed and secured by a lock 108 such that the money bin 96 can be transported to a secure location.

In the preferred embodiment of the invention, the money bin 96 is sized to receive and hold up to 1,500 bills. The size of the money bin 96 allows an owner of the car wash entry station to reduce the number of times the entry station needs to be emptied of stored money. As illustrated in FIG. 7, the money bin 96 can easily be removed from the security vault 58 and replaced with an empty bin. As best illustrated in FIG. 6, the security vault 58 includes a pair of guide rails 108, 110 to accurately position the money bin 96 within the security vault such that the money bin accurately receives both coins and bills.

Referring back to FIG. 7, the security vault 58 also encloses a money dispenser, such as a bill dispenser 112. The bill dispenser 112 is a conventional component that dispenses bills from a storage container 114. The bill dispenser 112 is used to return change to the car wash user when the car wash user deposits an amount of money that exceeds the cost of the service to be provided. The bill dispenser 112 includes a dispensing opening 116 (FIG. 7) that is generally aligned with a bill slot 118 formed in the vault door 82 of the security vault 58. When the bill dispenser 112 is activated, bills are ejected through the bill slot 118 and received in the bill return bin 38, as best illustrated in FIG. 1. Referring back to FIG. 3, the vault door 82 also includes a coin slot 120 such that the bill dispenser 112 (FIG. 7) could be replaced with a coin dispenser if desired. An advantage of a coin dispenser is that coins can generally be stored and dispensed in an easier fashion as compared to bills. However, both a coin dispenser and a bill dispenser are well known, commercially available components that can be selected as desired.

Referring back to FIG. 7, the bill dispenser 112 and bill holder 114 are each mounted to a movable platform 122 such that the platform 122 can be pulled out from the open interior of the security vault 58 to aid in servicing these components. As shown in FIG. 6, the movable platform 122 includes a plurality of rollers 124 received within a track 126 supported along the sides of a platform 128. The platform 128 is mounted to the bottom wall 94 of the security vault, as illustrated.

Referring now to FIG. 7, the security vault 58 includes an access handle 130 that allows the security vault 58 to be lifted by a mechanical lift or similar device.

Referring now to FIG. 3, an electrical conduit 132 extends from the security vault 58 to the electronics cabinet 42 to supply power to the bill dispensers and coin dispensers contained within the security vault 58. Preferably, the electrical conduit 132 is shielded to prevent damage or vandalism.

Figure 8:
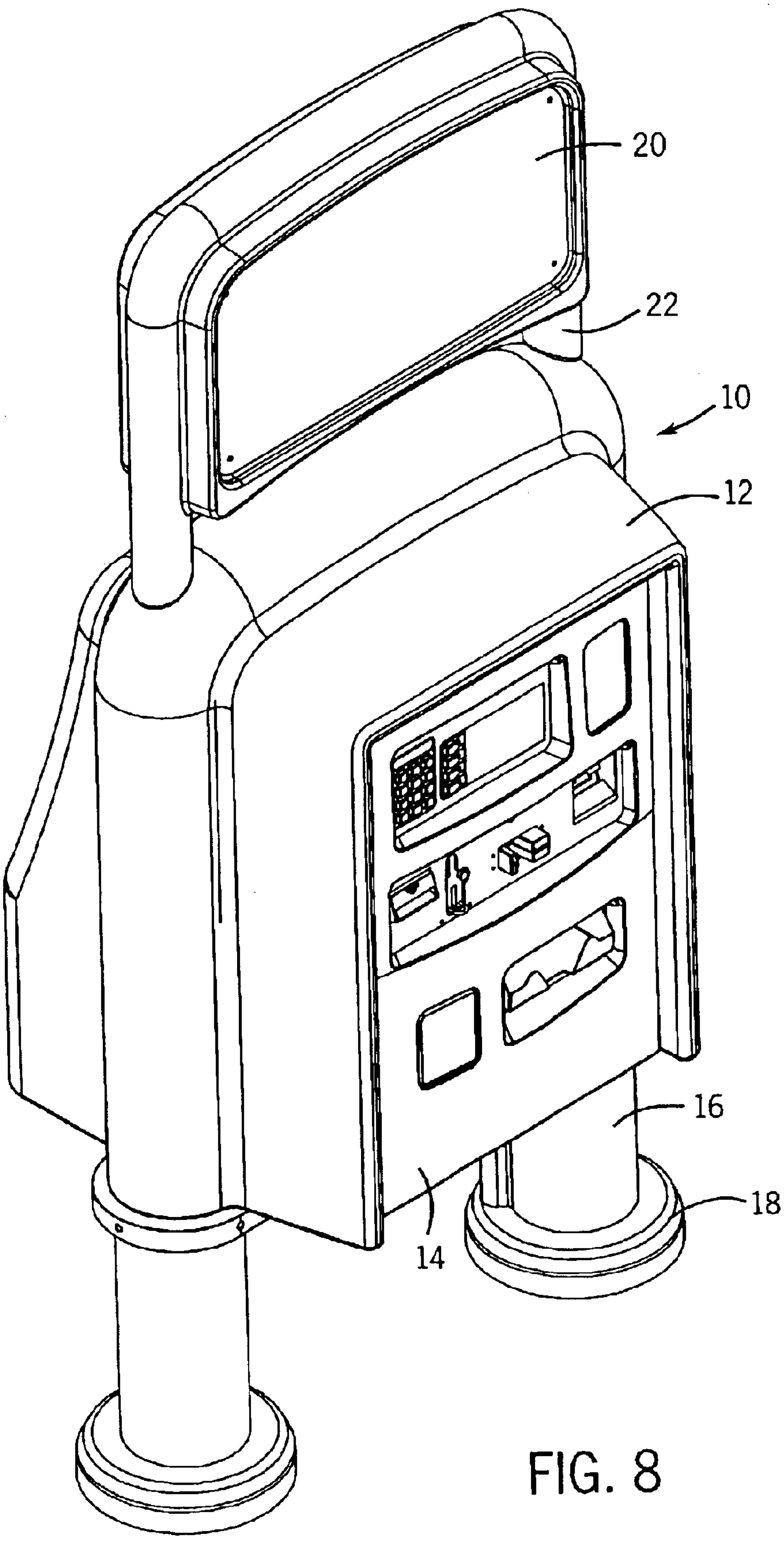
FIG. 8 is a front left perspective view of a second embodiment of the car wash entry station.
Figure 10:
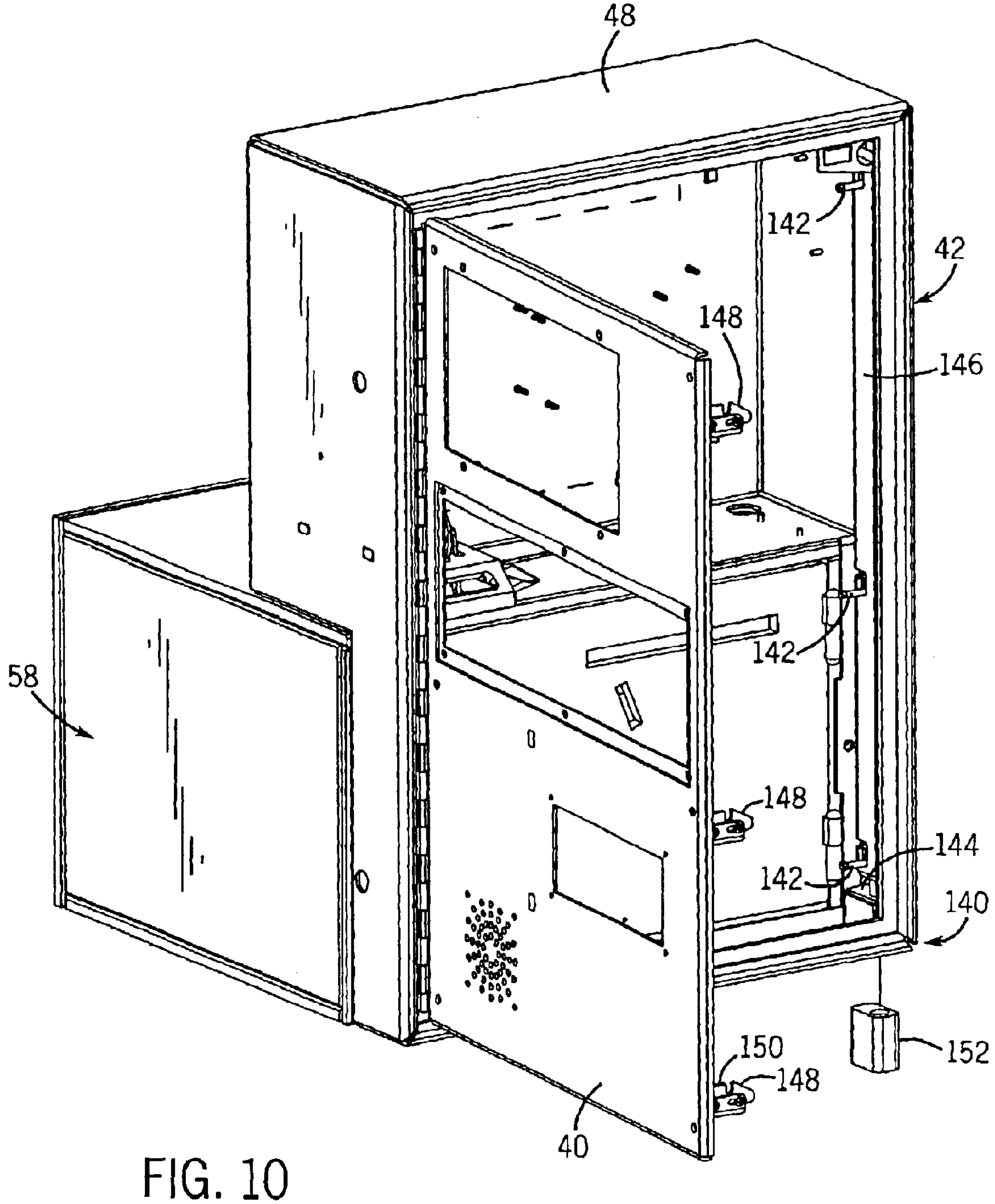
FIG. 10 is a front perspective view illustrating the open access door and the lock member used to secure the access door in a closed position.

A second embodiment of the entry station 10 is illustrated in FIG. 8. As compared to the first embodiment of the entry station illustrated in FIG. 2, the pair of lock members 70 are removed and replaced with an alternate lock member 140, as best illustrated in FIG. 10. The alternate lock member 140 cannot be seen when viewing the decorative face plate 14 of the entry station 10, as illustrated in FIG. 8.

Referring back to FIG. 10, the lock member 140 includes a plurality of locking pins 142 each mounted to a shaft 144 concealed behind a flange 146. The shaft 144 includes a bias spring (not shown) positioned between the shaft and the top wall 48 of the electronics cabinet 42. The bias spring forces each of the locking pins 142 downward against the bottom of a slot formed in the flange 146 and into the position illustrated in FIG. 10.

Access door 40 includes a plurality of spaced retaining brackets 148 each having a notch 150 that receives one of the locking pins 142. When the access door 40 is in the closed position, the interaction between the retaining brackets 148 and locking pins 142 prevent the access door 40 from being opened.

Figure 9:
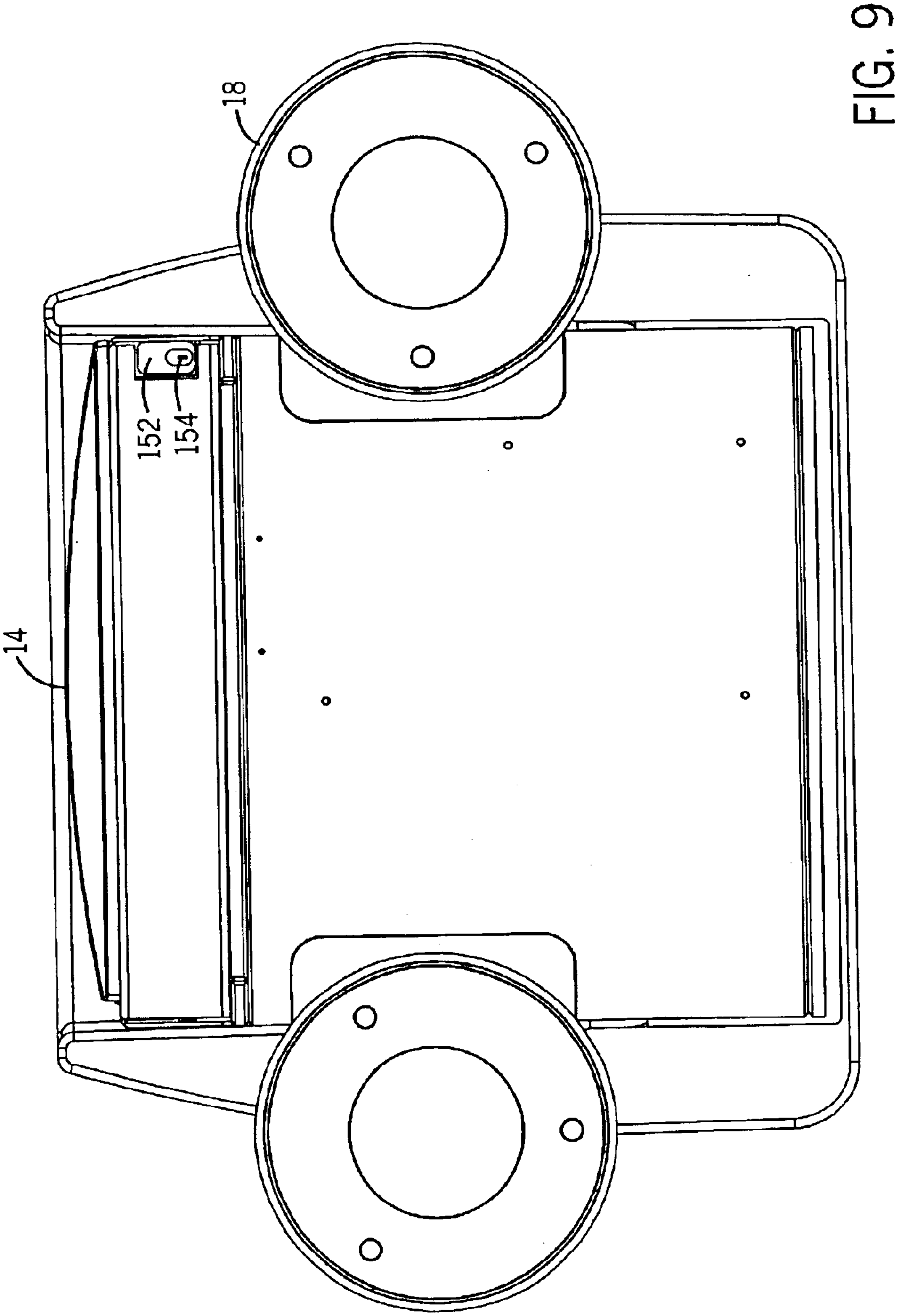
FIG. 9 is a bottom view illustrating the lock member used to secure the access door for the electronics cabinet.

The lock member 140 includes a removable lock body 152 that is received on a lower end of the pivot shaft 144. When the lock body 152 is received on the lower end of the shaft 144, the shaft 144 is prevented from moving in the upward direction. Thus, the lock body prevents the locking pins 142 from disengaging the brackets 148. Referring to FIG. 9, the lock body 152 includes a key slot 154 for receiving a unique key to remove the lock body 152. When the lock body is removed, as illustrated in FIG. 10, the shaft 144 can be moved upward against the bias force exerted by the spring positioned between the shaft and the top wall 48 of the electronics enclosure.

When the lock 152 is removed and the access door 40 closed, the locking pins 142 move upward along the sloped surface of each of the retaining brackets 148 until the pins 142 are retained within the notches 150. Once retained, the lock body 152 can be secured to the shaft 144 to prevent the access door 40 from being opened.

As with the first embodiment shown in FIGS. 1–8, the second embodiment of FIGS. 8–10 include separate first and second lock members such that the electronics cabinet 42 and the security vault require separate means for opening each. Thus, a technician can be given the means to open the first lock member of the electronics cabinet without having the ability to open the security vault.

Various alternatives and embodiments are contemplated as being within the scope of the following claims particularly pointing out and distinctly claiming the subject matter regarded as the invention.

We claim:

1. An entry station for a car wash for receiving payment from a user, communicating with the car wash and authorizing operation of the car wash upon receipt of payment, the entry station comprising:

an enclosed electronics cabinet defining an open interior and having an access door including a first lock member to control access to the open interior;

a control unit contained within the open interior, the control unit being operable to communicate with the car wash;

a money validator located substantially within the open interior and operable to receive money from the user; and a security vault positioned to securely store money received by the money vaildator, the security vault defining a vault interior having a vault door including a second lock member to control access to the vault interior, wherein the first lock member and the second lock member are independently operable and the vault door is enclosed within the electronics cabinet such that the vault door can be opened only when the access door of the electronics cabinet is open.

2. The entry station of claim 1 further comprising a money dispenser having a money supply contained in the security vault, the money dispenser operable to dispense money through a money slot formed in the security vault.

3. The entry station of claim 1 further comprising a money bin contained in the security vault, the money bin being aligned with a chute providing access into the vault interior and positioned to receive money from the money validator.

4. The entry station of claim 1 wherein the money validator is a bill validator.

5. The entry station of claim 1 wherein the money validator is a coin validator.

6. The entry station of claim 1 wherein the second lock member is a combination lock.

7. The entry station of claim 6 wherein the first lock member is a key lock.

8. The entry station of claim 1 wherein the security vault is an ATM-grade security vault.

9. The entry station of claim 1 wherein the electronics cabinet is mounted to the security vault, the security vault including a money chute aligned with the money validator such that money from the money validator as deposited into the security vault through the money chute.

10. The entry station of claim 1 wherein the first lock member and the second lock member include different means for opening.

11. An entry station for a car wash for receiving payment from a user, communicating with the car wash and authorizing operation of the car wash upon receipt of payment, the entry station comprising:

an enclosed electronics cabinet defining an open interior and having an access door including a first lock member to control access to the open interior, a control unit contained within the open interior, the control unit being operable to communicate with the car wash;

a money validator located substantially within the open interior of the electronics cabinet and operable to receive money from the user, and a security vault positioned to securely stote money received floin the money validator, the security vault defining a vault interior having a vault door including a second lock member to control access to the vault interior, wherein the electronics cabinet is mounted to the security vault such that the vault door of the security vault is accessible only when the access door of the electronics cabinet is open.

12. The entry station of claim 11 wherein the electronics cabinet extends past the security vault such that the electronics cabinet conceals the vault door of the security vault.

13. The entry station of claim 11 further comprising a money dispenser having a money supply contained in the security vault, the money dispenser being operable to dispense money through a slot formed in the security vault.

14. The entry station of claim 11 further comprising a money bin contained in the security vault, the money bin being aligned with a chute providing access into the security vault, the chute being positioned to receive money from the money validator.

15. The entry station of claim 11 wherein the money validator is a coin validator located substantially within the electronics cabinet.

16. The entry station of claim 11 wherein the second lock member is a combination lock.

17. The entry station of claim 16 wherein the first lock member is a key lock such that the first lock member and the second lock member are independently operable.

18. The entry station of claim 11 wherein the security vault is an ATM-grade security vault.

19. The entry station of claim 11 wherein the money validator is mounted to the access door of the enclosed electronics cabinet.

* * * * *